US008468286B2

(12) United States Patent
Yao et al.

(10) Patent No.: US 8,468,286 B2
(45) Date of Patent: Jun. 18, 2013

(54) VARIABLE-FREQUENCY BUS ADAPTER, ADAPTING METHOD AND SYSTEM

(75) Inventors: Cong Yao, Shenzhen (CN); Qiwei Liu, Shenzhen (CN); Yu Liu, Shenzhen (CN); Xiang Li, Shenzhen (CN); Liqian Chen, Shenzhen (CN); Shiming He, Shenzhen (CN); Jiayin Lu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 295 days.

(21) Appl. No.: 13/007,332

(22) Filed: Jan. 14, 2011

(65) Prior Publication Data

US 2011/0179207 A1    Jul. 21, 2011

(30) Foreign Application Priority Data

Jan. 15, 2010    (CN) .......................... 2010 1 0000692

(51) Int. Cl.
*G06F 5/06*        (2006.01)
(52) U.S. Cl.
USPC ............ 710/305; 713/322; 713/600; 713/601
(58) Field of Classification Search
USPC .......................... 710/305; 713/322, 600, 601
See application file for complete search history.

(56) References Cited

U.S. PATENT DOCUMENTS

| 6,715,096 B2 * | 3/2004 | Kuge ............................. 713/600 |
| 7,051,218 B1 * | 5/2006 | Gulick et al. ................. 713/310 |
| 7,093,153 B1 * | 8/2006 | Witek et al. ................... 713/600 |
| 7,290,163 B2 * | 10/2007 | Yanagihara ................... 713/600 |
| 7,539,793 B2 * | 5/2009 | Foster et al. .................... 710/61 |
| 7,657,764 B2 * | 2/2010 | Jorgenson et al. ............ 713/300 |
| 7,676,686 B2 * | 3/2010 | Ku et al. ........................ 713/600 |
| 7,734,944 B2 * | 6/2010 | Chen et al. .................... 713/400 |
| RE41,752 E * | 9/2010 | Oh ................................ 713/503 |
| 7,836,326 B2 * | 11/2010 | Shimada et al. .............. 713/600 |
| 8,370,662 B2 * | 2/2013 | Kim ............................... 713/322 |
| 2002/0067785 A1 | 6/2002 | Tanahashi |
| 2002/0095558 A1 | 7/2002 | Shiosaki |
| 2006/0090054 A1 * | 4/2006 | Choi et al. ..................... 711/167 |
| 2006/0117148 A1 * | 6/2006 | Liu et al. ....................... 711/146 |
| 2009/0204831 A1 * | 8/2009 | Cousson et al. .............. 713/322 |
| 2010/0115323 A1 * | 5/2010 | Yamaguchi et al. .......... 713/400 |
| 2011/0271126 A1 * | 11/2011 | Hill ............................... 713/320 |

FOREIGN PATENT DOCUMENTS

| JP | 60012828 A | * | 1/1985 |
| JP | 11252806 A | * | 9/1999 |
| JP | 2000201181 A | * | 7/2000 |
| JP | 2002341978 A | * | 11/2002 |
| JP | 2006067730 A | * | 3/2006 |
| WO | WO 2005052820 A1 | * | 6/2005 |
| WO | WO 2008089460 A1 | * | 7/2008 |

OTHER PUBLICATIONS

Kumar Yadav, Manoj; Casu, Mario R.; Zamboni, Maurizio; , "A Simple DVFS Controller for a NoC Switch," Ph.D. Research in Microelectronics and Electronics (PRIME), 2012 8th Conference on, pp. 1-4, Jun. 12-15, 2012.*

(Continued)

*Primary Examiner* — Faisal M Zaman

(57) ABSTRACT

A variable-frequency bus adapter, a variable-frequency bus adapting method and a variable-frequency bus adapting system are provided. The method includes: generating a bus blocking indication according to a dynamic frequency scaling (DFS) request signal sent by a bus side; blocking a current bus transfer according to the bus blocking indication; and feeding back a DFS response signal to the bus side after blocking the current bus transfer, where the DFS response signal is adapted to enable the bus side to perform a DFS operation. In the method, the bus transfer is temporarily blocked during the DFS, so that undesired influence on peripheral components caused by unstable bus block during the bus DFS is reduced without increasing the number of clock domains of the system or modifying the peripheral components, thus reducing the complexity of the implementation of the system, and improving the applicability of dynamic voltage frequency scaling (DVFS).

18 Claims, 9 Drawing Sheets

OTHER PUBLICATIONS

Ku He; Yibo Chen; Rong Luo; , "A System Level Fine-Grained Dynamic Voltage and Frequency Scaling for Portable Embedded Systems with Multiple Frequency Adjustable Components," Portable Information Devices, 2007. PORTABLE07. IEEE International Conference on , pp. 1-5, May 25-29, 2007.*

Nose, K.; Shibayama, A.; Kodama, H.; Mizuno, M.; Edahiro, M.; Nishi, N.; , "Deterministic inter-core synchronization with periodically all-in-phase clocking for low-power multi-core SoCs," Solid-State Circuits Conference, 2005. Digest of Technical Papers. ISSCC. 2005 IEEE International , pp. 296-599 vol. 1, 10—Feb. 10, 2005.*

Heechul Yun; Po-Liang Wu; Arya, A.; Abdelzaher, T.; CheolGi Kim; Lui Sha; , "System-Wide Energy Optimization for Multiple DVS Components and Real-Time Tasks,"Real-Time Systems (ECRTS), 2010 22nd Euromicro Conference on , pp. 133-142, Jul. 6-9, 2010.*

Search Report dated Jan. 28, 2013 in connection with Chinese Patent Application No. 201010000692.1.

Partial translation of Office Action dated Feb. 5, 2013 in connection with Chinese Patent Application No. 201010000692.1.

* cited by examiner

VARIABLE-FREQUENCY BUS ADAPTER, ADAPTING METHOD AND SYSTEM

CROSS-REFERENCE TO RELATED APPLICATION

This application claims priority to Chinese Patent Application No. 201010000692.1, filed on Jan. 15, 2010, which is hereby incorporated by reference in its entirety.

TECHNICAL FIELD

The present invention relates to the field of adaptation, and in particular, to a variable-frequency bus adapter, a variable-frequency bus adapting method, and a variable-frequency bus adapting system.

BACKGROUND

Chips of handheld devices have strict requirements on battery life and power consumption, and the dynamic voltage frequency scaling (DVFS) technology can effectively reduce dynamic power consumption by dynamically scaling the working frequency (F) and working voltage (V) according to the real-time load demand of the operating system of the handheld device. At present, one of the important technical problems in the application of the DVFS technology is how to ensure normal operation of peripheral components on the bus during bus dynamic frequency scaling (DFS).

In the implementation of the present invention, the inventor finds that, numerous peripheral components have various constraints on the bus clock, but the clock constraints cannot be satisfied during dynamic variation of the bus clock. In order to ensure normal operation of the peripheral components on the bus during the bus DFS, in the prior art, a separated structure of clock domains is adopted, which will increase the number of the clock domains, thus increasing the complexity of the implementation of the system; or complex modifications are made to the peripheral components, so as to adapt the peripheral components to a variable-frequency bus, but such a solution is complex, because the modification to each peripheral component needs to be made according to the specific conditions. In view of the above, the existing technical solutions are complex to implement, and thus the application of DVFS is limited.

SUMMARY

The present invention is directed to a variable-frequency bus adapter, a variable-frequency bus adapting method, and a variable-frequency bus adapting system, so as to reduce the complexity of the implementation of the system, and improve the applicability of DVFS.

According to a first aspect, an embodiment of the present invention provides a variable-frequency bus adapting method, where the method includes: generating a bus blocking indication according to a DFS request signal sent by a bus side; blocking a current bus transfer according to the bus blocking indication; and feeding back a DFS response signal to the bus side after blocking the current bus transfer, where the DFS response signal is adapted to enable the bus side to perform a DFS operation.

According to a second aspect, an embodiment of the present invention further provides a variable-frequency bus adapter, where the variable-frequency bus adapter includes: a DFS handshake unit, adapted to generate a bus blocking indication according to a DFS request signal sent by a bus side; and a bus transaction blocking unit, adapted to block a current bus transfer according to the bus blocking indication. The DFS handshake unit is further adapted to feed back a DFS response signal to the bus side after the bus transaction blocking unit blocks the current bus transfer, where the DFS response signal is adapted to enable the bus side to perform a DFS operation.

According to a third aspect, an embodiment of the present invention further provides a variable-frequency bus adapting system, where the system includes a variable-frequency bus and a plurality of peripheral components attached to the variable-frequency bus, and further includes a plurality of variable-frequency bus adapters as described above, where the plurality of variable-frequency bus adapters is disposed between the variable-frequency bus and the plurality of peripheral components respectively.

In the embodiments of the present invention, the bus transfer is temporarily blocked during the DFS, so that undesired influence on the peripheral components caused by unstable bus clock during the bus DFS is reduced without increasing the number of clock domains of the system or modifying the peripheral components, thus reducing the complexity of the implementation of the system, and improving the applicability of DVFS.

BRIEF DESCRIPTION OF THE DRAWINGS

The accompanying drawings described herein are used for facilitating understanding of the present invention and is a part of the description, but are not limitative of the present invention, where.

DETAILED DESCRIPTION

In order to make the objectives, technical solutions, and advantages of the present invention more comprehensible, the present invention is described in further detail in the following with reference to some exemplary embodiments and the accompanying drawings. Herein, the exemplary embodiments of the present invention and description thereof are intended to illustrate the present invention only, but are not limitative of the present invention.

Figure 1:
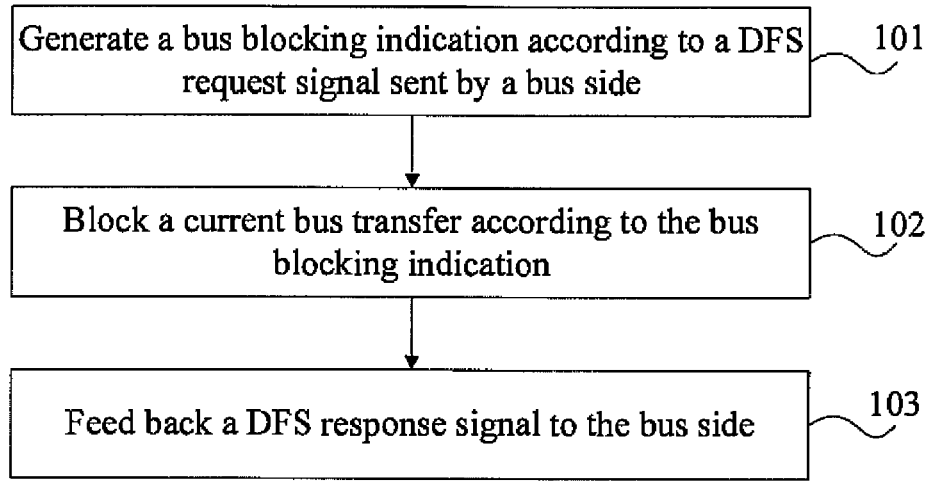
FIG. 1 is a flow chart of a method according to an embodiment of the present invention.

FIG. 1 is a flow chart of a method according to an embodiment of the present invention, where the method is applied to a variable-frequency bus adapter. Referring to FIG. 1, the method includes the following steps.

In step 101, a bus blocking indication is generated according to a DFS request signal sent by a bus side.

In this embodiment, if a bus intends to perform DFS of the bus clock, first, a DFS main controller sends a DFS request signal to a variable-frequency bus adapter applying the method of this embodiment.

In this embodiment, in order to avoid the influence of the DFS of the bus clock on a peripheral component attached to the bus, according to the method of this embodiment, a bus blocking indication is generated according to the DFS request signal, so as to block information interaction between the bus and the peripheral component.

In step 102, a current bus transfer is blocked according to the bus blocking indication.

In this embodiment, according to the bus blocking indication generated in step 101, the current bus transfer is blocked, that is, normal interaction between the bus and the peripheral component is suspended.

In step 103, a DFS response signal is fed back to the bus side, where the DFS response signal is adapted to enable the bus side to perform a DFS operation.

In this embodiment, after the bus transfer is blocked in step 102, a DFS response signal is fed back to the bus side to indicate that the blocking is completed, and meanwhile, the bus performs a bus DFS operation. Because the current bus operation of the peripheral component is blocked, the peripheral component does not work, so that even if the bus clock is unstable during the bus DFS, the peripheral component will not be influenced, and thus no abnormal error will occur in the peripheral component.

According to an implementation of this embodiment, as for some bus operations, for example, a bufferable write operation, even when the current bus transfer is blocked, the peripheral component actually still works internally to process the previous bus operation. Therefore, after the current bus transfer is blocked, a timer may be started to delay for a period of time, so as to ensure that the peripheral component does not work internally. When the timer times out, that is, when a preset delay time is exceeded, a DFS response signal is fed back to the bus side, that is, the DFS main controller of the bus side, to indicate that the current bus operation is blocked and the peripheral component does not work. The delay time may be counted by the bus clock, and the count value may be configured by software, but this embodiment does not limit the specific implementation mode.

In this embodiment, the bus transfer is temporarily blocked during the DFS, so that the undesired influence on the peripheral component caused by unstable bus clock during the bus DFS is reduced without increasing the number of clock domains of the system or modifying the peripheral component, thus reducing the complexity of the implementation of the system, and improving the applicability of DVFS.

Figure 2:
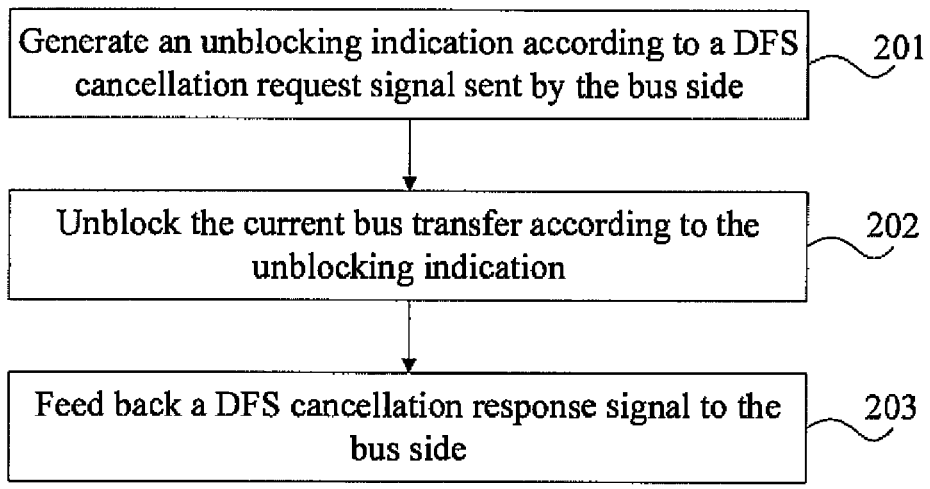
FIG. 2 is a flow chart of a method according to another embodiment of the present invention.

FIG. 2 is a flowchart of a method according to another embodiment of the present invention, where the method is applied to a variable-frequency bus adapter. Referring to FIG. 2, based on the method in FIG. 1, the method of this embodiment further includes the following steps.

In step 201, an unblocking indication is generated according to a DFS cancellation request signal sent by the bus side, where the DFS cancellation request signal is sent by the bus side when the DFS operation ends.

In this embodiment, once the bus DFS ends, and the bus clock is stable, the DFS main controller sends a DFS cancellation request signal to the variable-frequency bus adapter applying the method of this embodiment.

In this embodiment, because the current bus transfer is blocked according to the steps of the method in FIG. 1, after the bus DFS ends, the bus transfer needs to be restored. Therefore, according to the method of this embodiment, after receiving the DFS cancellation request signal sent by the bus side, an unblocking indication is generated according to the signal to restore the bus transfer.

In step 202, the current bus transfer is unblocked according to the unblocking indication.

In this embodiment, according to the unblocking indication generated in step 201, the current bus transfer is unblocked, that is, the normal interaction between the bus and the peripheral component is restored.

In step 203, a DFS cancellation response signal is fed back to the bus side.

In this embodiment, after the current bus transfer is unblocked in step 202, a DFS cancellation response signal is fed back to the bus side to indicate that the current bus transfer is unblocked.

In this embodiment, the bus control signal varies with different bus systems; and therefore, according to the method of this embodiment, the blocking the current bus transfer or unblocking the current bus transfer may be realized through different methods, which are illustrated in the following with reference to the accompanying drawings.

Figure 3:
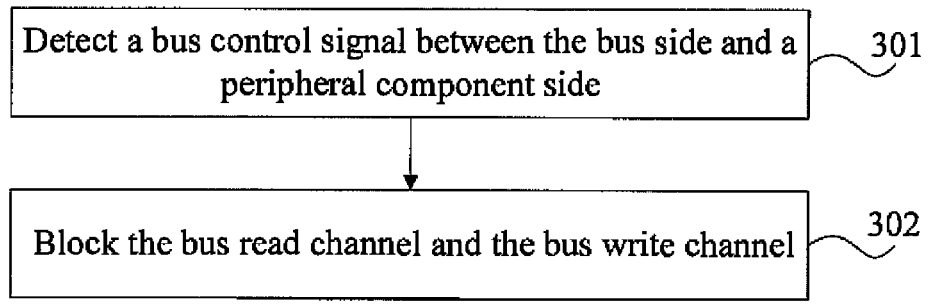
FIG. 3 is a flow chart of blocking a bus transfer according to an embodiment of the present invention.

FIG. 3 is a flow chart of a method for blocking the current bus transfer according to an implementation of this embodiment. In this implementation, bus read/write channels are separated; and therefore, according to the method of this embodiment, the read/write channels are monitored and blocked independently. Referring to FIG. 3, the method includes the following step.

In step 301, a bus control signal between the bus side and a peripheral component side is detected.

In step 302, the bus read channel and the bus write channel are blocked according to the detected bus control signal.

In this implementation, the blocking the bus read channel includes:

as for a read address bus, setting a detected bus control signal (arready) of the bus side representing that a slave device is capable of receiving read address and control information to be a preset low level, and setting a detected bus control signal (arvalid) of the peripheral component side representing a read address and control information valid flag to be a preset low level; and as for a read data bus, after the current transfer completes the last read data, setting a detected bus control signal (rready) of the peripheral component side representing that a master device is capable of receiving read data to be a preset low level, and setting a detected bus control signal (rvalid) of the bus side representing that read data is valid to be a preset low level.

In this embodiment, the blocking the bus write channel includes:

as for a write address bus, setting a detected bus control signal (awready) of the bus side representing that a slave device is capable of receiving write address and control information to be a preset low level, and setting a detected bus control signal (awvalid) of the peripheral component side representing a write address and control information valid flag to be a preset low level;

as for a write data bus, after the current transfer completes the last write data, setting a detected bus control signal (wready) of the bus side representing that a slave device is capable of receiving write data to be a preset low level, and setting a detected bus control signal (wvalid) of the peripheral component side representing that write data is valid to be a preset low level; and as for a write response bus, setting a detected bus control signal (bready) of the peripheral component side representing that a master device is capable of receiving feedback information to be a preset low level, and setting a detected bus control signal (bvalid) of the bus side representing completion of a write operation fed back by a slave device to be a preset low level.

Figure 4:
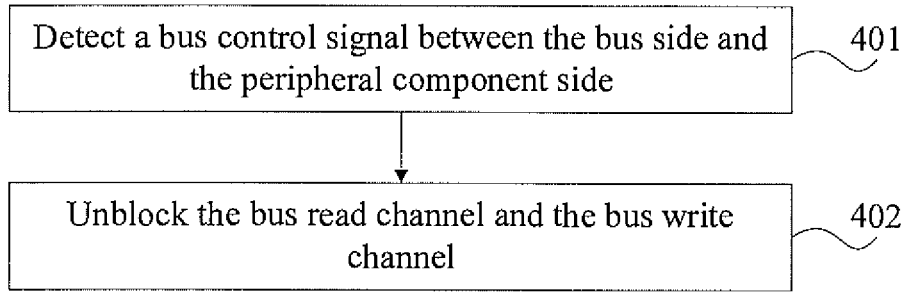
FIG. 4 is a flow chart of unblocking the bus transfer according to the embodiment as shown in FIG. 3.

FIG. 4 is a flow chart of a method for unblocking the current bus transfer according to the implementation as shown in FIG. 3. In this implementation, because the bus read/write channels are separated, according to the method of this embodiment, the read/write channels are monitored and unblocked independently. Referring to FIG. 4, the method includes the following steps.

In step 401, a bus control signal between the bus side and the peripheral component side is detected.

In step 402, the bus read channel and the bus write channel are unblocked according to the detected bus control signal.

In this implementation, the unblocking the bus read channel includes:

as for a read address bus, transparently transmitting a detected bus control signal (aready) of the peripheral component side representing that a slave device is capable of receiving read address and control information to the bus side, and transparently transmitting a detected bus control signal (arvalid) of the bus side representing a read address and control information valid flag to the peripheral component side; and as for a read data bus, transparently transmitting a detected bus control signal (rready) of the bus side representing that a master device is capable of receiving read data to the peripheral component side, and transparently transmitting a detected bus control signal (rvalid) of the peripheral component side representing that read data is valid to the bus side.

In this embodiment, the unblocking the bus write channel includes:

as for a write address bus, transparently transmitting a detected bus control signal (aweady) of the peripheral component side representing that a slave device is capable of receiving write address and control information to the bus side, and transparently transmitting a detected bus control signal (awvalid) of the bus side representing a write address and control information valid flag to the peripheral component side;

as for a write data bus, transparently transmitting a detected bus control signal (wready) of the peripheral component side representing that a slave device is capable of receiving write data to the bus side, and transparently transmitting a detected bus control signal (wvalid) of the bus side representing that write data is valid to the peripheral component side; and as for a write response bus, transparently transmitting a detected bus control signal (bready) of the bus side representing that a master device is capable of receiving feedback information to the peripheral component side, and transparently transmitting a detected bus control signal (bvalid) of the peripheral component side representing completion of a write operation fed back by a slave device to the bus side.

Figure 5:
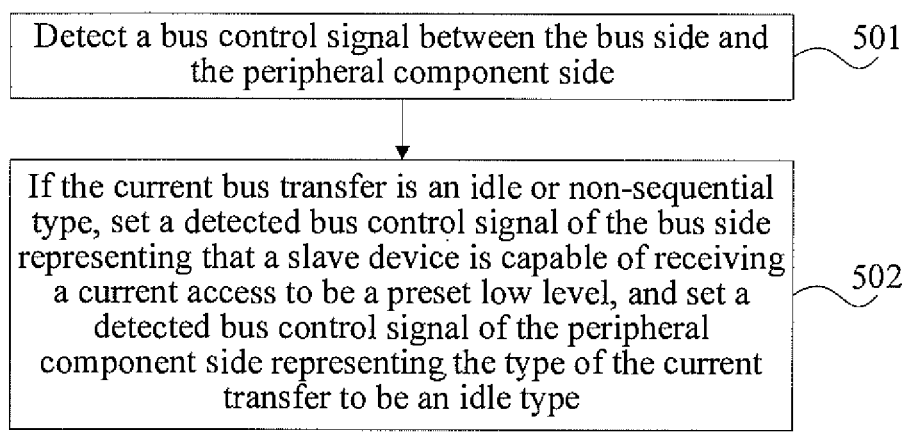
FIG. 5 is a flow chart of blocking a bus transfer according to another embodiment of the present invention.

FIG. 5 is a flow chart of a method for blocking the current bus transfer according to another implementation of this embodiment. In this implementation, because the bus read/write channels are multiplexed, according to the method of this embodiment, only a set of buses need to be monitored and blocked. Referring to FIG. 5, the method includes the following steps.

In step 501, a bus control signal between the bus side and the peripheral component side is detected.

In step 502, if the current bus transfer is an idle or non-sequential type, a detected bus control signal (hready) of the bus side representing that a slave device is capable of receiving a current access is set to be a preset low level, and a detected bus control signal (htrans) of the peripheral component side representing the type of the current transfer is set to be an idle type.

Figure 6:
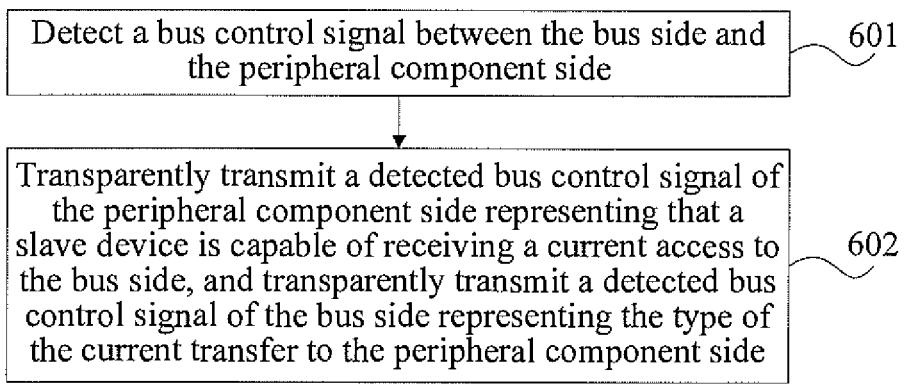
FIG. 6 is a flow chart of unblocking the bus transfer according to the embodiment as shown in FIG. 5.

FIG. 6 is a flow chart of a method for unblocking the current bus transfer according to the implementation as shown in FIG. 5. In this implementation, because the bus read/write channels are multiplexed, according to the method of this embodiment, a set of buses are monitored and unblocked. Referring to FIG. 6, the method includes the following steps.

In step 601, a bus control signal between the bus side and the peripheral component side is detected.

In step 602, a detected bus control signal (hready) of the peripheral component side representing that a slave device is capable of receiving a current access is transparently transmitted to the bus side, and a detected bus control signal (htrans) of the bus side representing the type of the current transfer is transparently transmitted to the peripheral component side.

In this embodiment, the bus transfer is temporarily blocked during the DFS, so that the undesired influence on the peripheral component caused by unstable bus clock during the bus DFS is avoided. After the DFS is completed, the bus transfer is unblocked to restore the interaction between the bus and the peripheral component, so as to ensure normal operation of the bus and the peripheral component. This embodiment does not need to increase the number of clock domains of the system or modify the peripheral component, thus reducing the complexity of the implementation of the system, and improving the applicability of DVFS.

Figure 7:
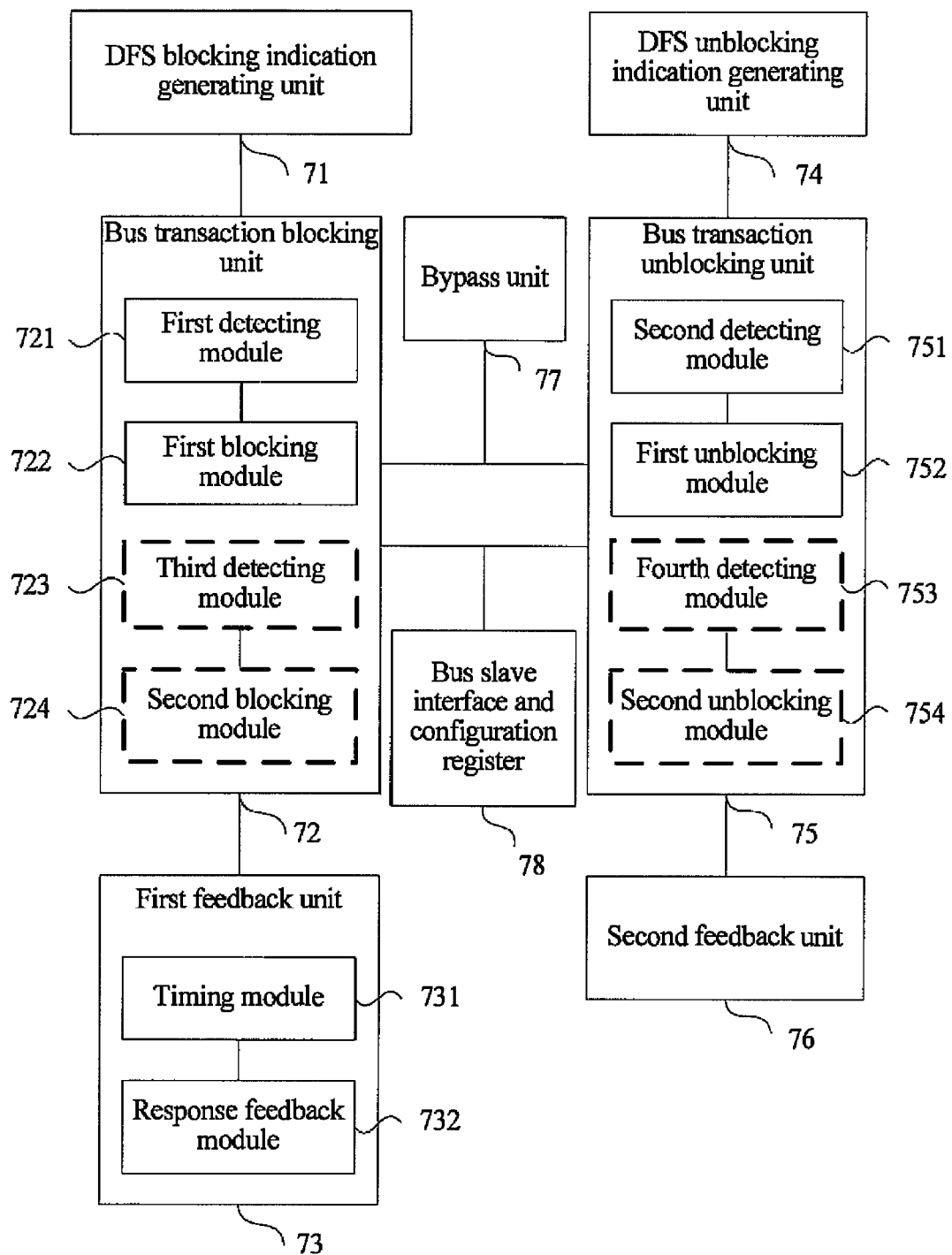
FIG. 7 is a schematic view of components of a variable-frequency bus adapter according to an embodiment of the present invention.

FIG. 7 is schematic view of components of a variable-frequency bus adapter according to an embodiment of the present invention. Referring to FIG. 7, the variable-frequency bus adapter of this embodiment mainly includes: a DFS blocking indication generating unit 71, a bus transaction blocking unit 72, and a first feedback unit 73.

The DFS blocking indication generating unit 71 is adapted to generate a bus blocking indication according to a DFS request signal sent by a bus side.

The bus transaction blocking unit 72 is adapted to block a current bus transfer according to the bus blocking indication.

The first feedback unit 73 is adapted to feedback a DFS response signal to the bus side after the bus transaction blocking unit 72 blocks the current bus transfer, where the DFS response signal is adapted to enable the bus side to perform a DFS operation.

In this embodiment, the DFS blocking indication generating unit 71 handshakes with a DFS main controller of the bus. When the DFS main controller, for example, CRG or SCtrl, sends a DFS request signal to the DFS blocking indication generating unit 71, the variable-frequency bus adapter of this embodiment immediately starts the bus transaction blocking unit 72, that is, the DFS blocking indication generating unit 71 generates a bus blocking indication and sends the bus blocking indication to the bus transaction blocking unit 72, so as to start the blocking function of the bus transaction blocking unit 72, and when the bus transaction blocking unit 72 completes the operation of blocking the current bus transfer, the first feedback unit 73 feeds back a DFS response signal to the DFS main controller, where the DFS response signal is adapted to enable the bus side to perform a DFS operation.

According to an implementation of this embodiment, the variable-frequency bus adapter further includes: a DFS unblocking indication generating unit 74, a bus transaction unblocking unit 75, and a second feedback unit 76.

The DFS unblocking indication generating unit 74 is adapted to generate an unblocking indication according to a DFS cancellation request signal sent by the bus side, where the DFS cancellation request signal is sent by the bus side when the DFS operation ends.

The bus transaction unblocking unit 75 is adapted to unblock the current bus transfer according to the unblocking indication.

The second feedback unit 76 is adapted to feed back a DFS cancellation response signal to the bus side after the bus transaction blocking unit unblocks the current bus transfer.

In this embodiment, when the DFS main controller sends a DFS cancellation request signal to the DFS unblocking indication generating unit 74, the variable-frequency bus adapter of this embodiment immediately starts the bus transaction unblocking unit 75, that is, the DFS unblocking indication generating unit 74 generates an unblocking indication and sends the unblocking indication to the bus transaction unblocking unit 75, so as to start the unblocking function of the bus transaction unblocking unit 75; and when the bus transaction unblocking unit 75 completes the operation of unblocking the current bus transfer, the second feedback unit 76 feeds back a DFS cancellation response signal to the DFS main controller.

Figure 8:
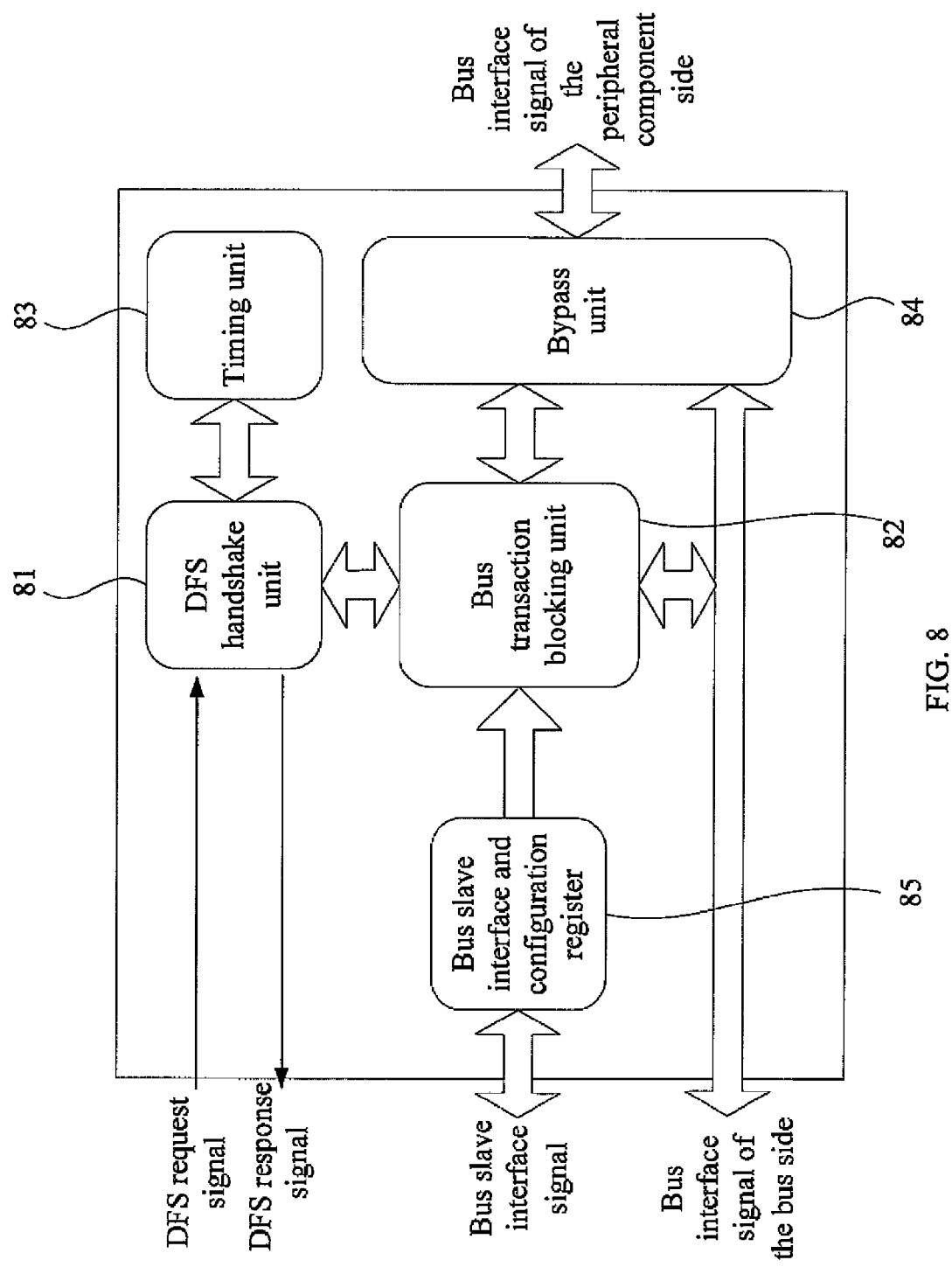
FIG. 8 is a schematic structural view of a variable-frequency bus adapter according to an embodiment of the present invention.

In this embodiment, the DFS blocking indication generating unit 71, the DFS unblocking indication generating unit 74, the first feedback unit 73, and the second feedback unit 76 may be realized by one component, for example, the DFS handshake unit in FIG. 8; and the bus transaction blocking unit 72 and the bus transaction unblocking unit 75 may be realized by one component, for example, a bus transaction processing unit as shown in FIG. 8.

In this embodiment, the bus transaction processing unit performs real-time monitoring on the bus transaction. When the DFS handshake unit sends a bus blocking indication, the bus transaction processing unit temporarily blocks the current bus transfer to suspend the normal interaction between the bus and a peripheral component; and when the DFS handshake unit sends an unblocking indication, the bus transaction processing unit immediately unblocks the current bus transfer to restore the normal interaction between the bus and the peripheral component.

According to an implementation of this embodiment, the bus transaction blocking unit 72 includes: a first detecting module 721 and a first blocking module 722, and reference is still made to FIG. 7.

The first detecting module 721 is adapted to detect a bus control signal between a bus and a peripheral component.

The first blocking module 722 is adapted to block the bus transfer, which includes: as for a read address bus, setting a bus control signal (arready) of the bus side detected by the first detecting module 721 and representing that a slave device is capable of receiving read address and control information to be a preset low level, and setting a bus control signal (arvalid) of the peripheral component side detected by the first detecting module 721 and representing a read address and control information valid flag to be a preset low level; as for a read data bus, after the current transfer completes the last read data, setting a bus control signal (rready) of the peripheral component side detected by the first detecting module 721 and representing that a master device is capable of receiving read data to be a preset low level, and setting a bus control signal (rvalid) of the bus side detected by the first detecting module 721 and representing that read data is valid to be a preset low level; as for a write address bus, setting a bus control signal (awready) of the bus side detected by the first detecting module 721 and representing that a slave device is capable of receiving write address and control information to be a preset low level, and setting a bus control signal (awvalid) of the peripheral component side detected by the first detecting module 721 and representing a write address and control information valid flag to be a preset low level; as for a write data bus, after the current transfer completes the last write data, setting a bus control signal (wready) of the bus side detected by the first detecting module 721 and representing that a slave device is capable of receiving write data to be a preset low level, and setting a bus control signal (wvalid) of the peripheral component side detected by the first detecting module 721 and representing that write data is valid to be a preset low level; and as for a write response bus, setting a bus control signal (bready) of the peripheral component side detected by the first detecting module 721 and representing that a master device is capable of receiving feedback information to be a preset low level, and setting a bus control signal (bvalid) of the bus side detected by the first detecting module 721 and representing completion of a write operation fed back by a slave device to be a preset low level.

In this implementation, the bus transaction unblocking unit 75 may include: a second detecting module 751 and a first unblocking module 752.

The second detecting module 751 is adapted to detect a bus control signal between the bus and the peripheral component.

The first unblocking module 752 is adapted to unblock the bus transfer, which includes: as for a read address bus, transparently transmitting a bus control signal (arready) of the peripheral component side detected by the second detecting module 751 and representing that a slave device is capable of receiving read address and control information to the bus side, and transparently transmitting a bus control signal (arvalid) of the bus side detected by the second detecting module 751 and representing a read address and control information valid flag to the peripheral component side; as for a read data bus, transparently transmitting a bus control signal (rready) of the bus side detected by the second detecting module 751 and representing that a master device is capable of receiving read data to the peripheral component side, and transparently transmitting a bus control signal (rvalid) of the peripheral component side detected by the second detecting module 751 and representing that read data is valid to the bus side; as for a write address bus, transparently transmitting a bus control signal (awready) of the peripheral component side detected by the second detecting module 751 and representing that a slave device is capable of receiving write address and control information to the bus side, and transparently transmitting a bus control signal (awvalid) of the bus side detected by the second detecting module 751 and representing a write address and control information valid flag to the peripheral component side; as for a write data bus, transparently transmitting a bus control signal (wready) of the peripheral component side detected by the second detecting module 751 and representing that a slave device is capable of receiving write data to the bus side, and transparently transmitting a bus control signal (wvalid) of the bus side detected by the second detecting module 751 and representing that write data is valid to the peripheral component side; and as for a write response bus, transparently transmitting a bus control signal (bready) of the bus side detected by the second detecting module 751 and representing that a master device is capable of receiving feedback information to the peripheral component side, and transparently transmitting a bus control signal (bvalid) of the peripheral component side detected by the second detecting module 751 and representing completion of a write operation fed back by a slave device to the bus side.

In this embodiment, when the bus transaction blocking unit 72 and the bus transaction unblocking unit 75 are realized by one component, the first detecting module 721 and the second detecting module 751 may be realized by one component.

Figure 10:
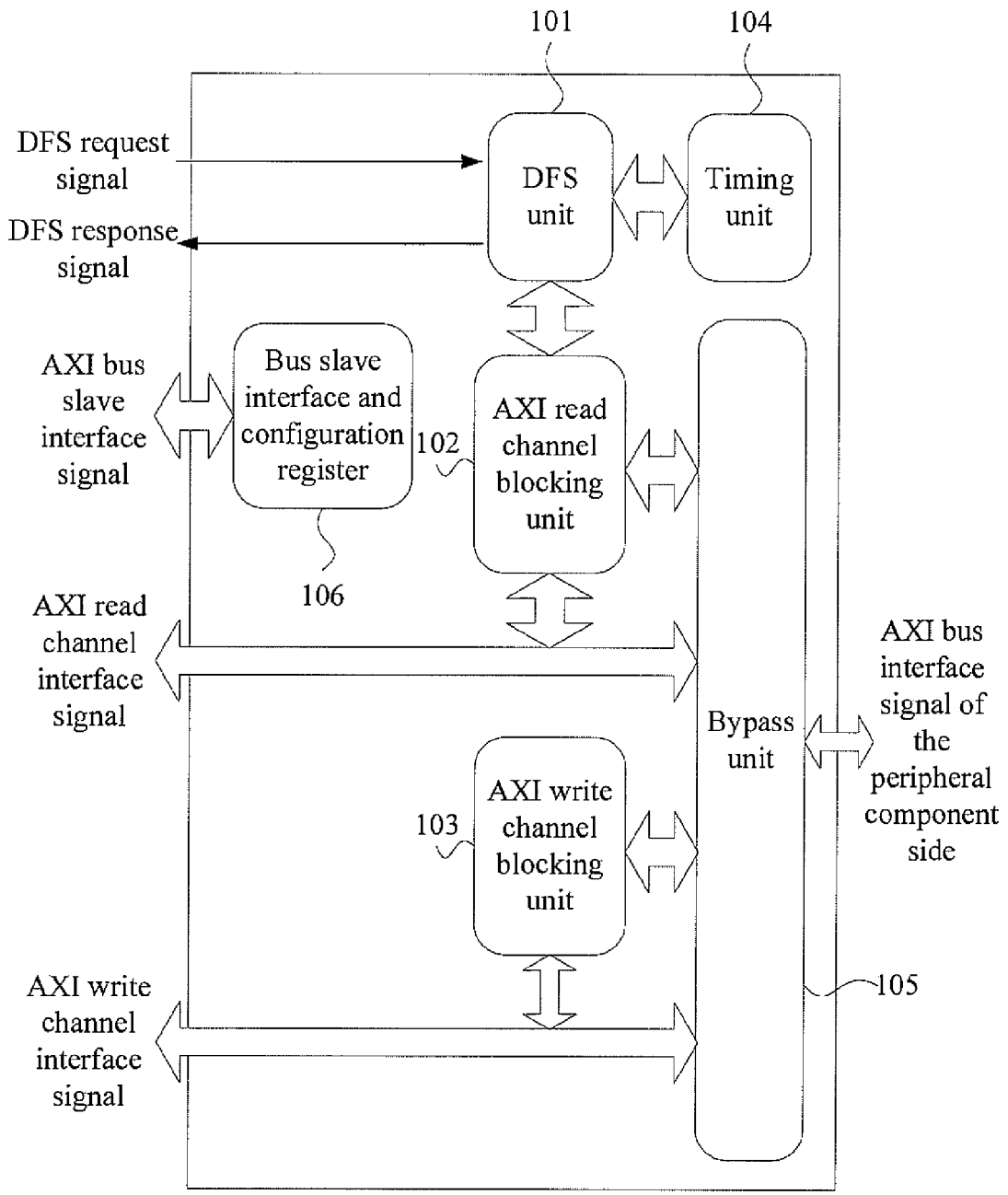
FIG. 10 is a schematic structural view of a variable-frequency bus adapter according to an embodiment of the present invention.

In this implementation, the bus transaction blocking unit 72 and the bus transaction unblocking unit 75 may be realized by an AXI read channel blocking unit 102 and an AXI write channel blocking unit 103 of an embodiment as shown in FIG. 10, but this embodiment does not limit the specific realizing mode.

According to another implementation of this embodiment, the bus transaction blocking unit 72 includes: a third detecting module 723 and a second blocking module 724, and reference is still made to FIG. 7.

The third detecting module 723 is adapted to detect a bus control signal between the bus and the peripheral component.

The second blocking module 724 is adapted to, when the current bus transfer is an idle or non-sequential type, set a bus control signal (hready) of the bus side detected by the third detecting module 723 and representing that a slave device is capable of receiving a current access to be a preset low level, and set a bus control signal (htrans) of the peripheral component side detected by the third detecting module 723 and representing the type of the current transfer to be an idle type.

In this implementation, the bus transaction unblocking unit 75 may further include: a fourth detecting module 753 and a second unblocking module 754, and reference is still made to FIG. 7.

The fourth detecting module 753 is adapted to detect a bus control signal between the bus and the peripheral component.

The second unblocking module 754 is adapted to transparently transmit a bus control signal (hready) of the peripheral component side detected by the fourth detecting module 753 and representing that a slave device is capable of receiving a current access to the bus side, and transparently transmit a bus control signal (htrans) of the bus side detected by the fourth detecting module 753 and representing the type of the current transfer to the peripheral component side.

In this embodiment, when the bus transaction blocking unit 72 and the bus transaction unblocking unit 75 is realized by one component, the third detecting module 723 and the fourth detecting module 753 may be realized by one component.

Figure 11:
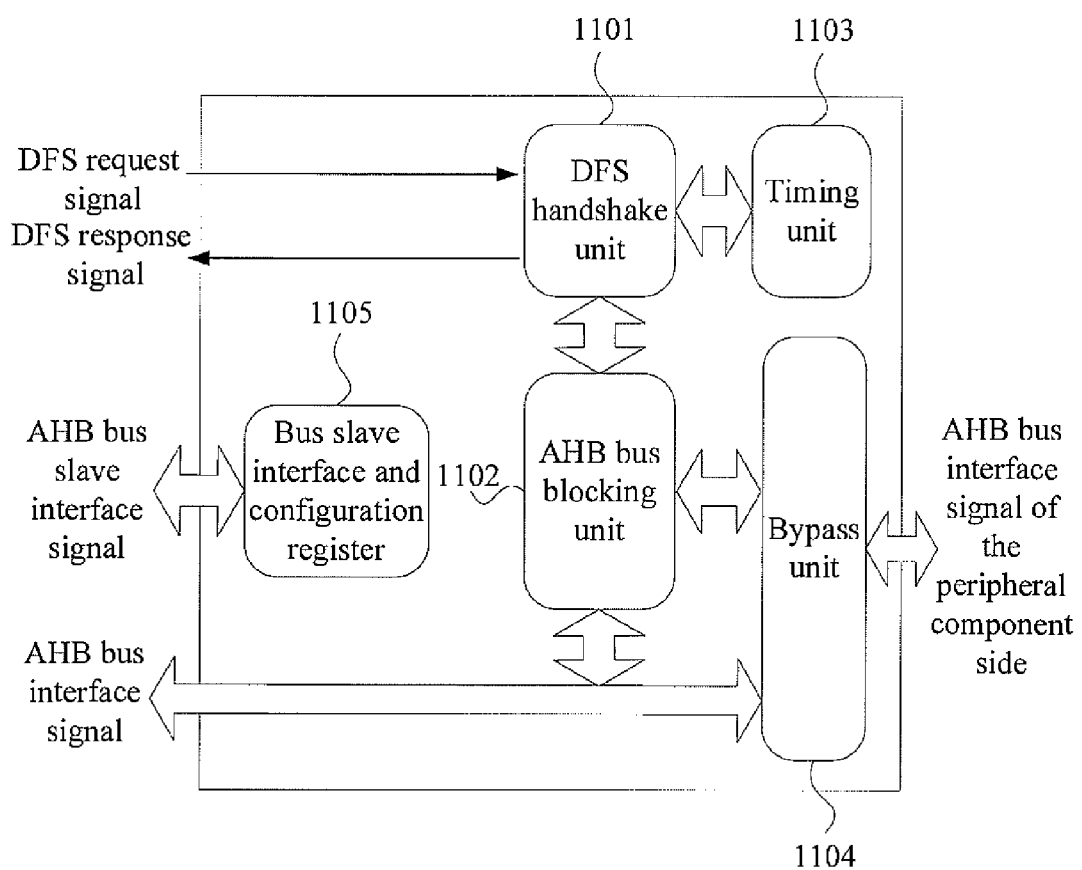
FIG. 11 is schematic structural view of a variable-frequency bus adapter according to another embodiment of the present invention.

In this implementation, the bus transaction blocking unit 72 and the bus transaction unblocking unit 75 may be realized by an AHB bus blocking unit 1102 of an embodiment as shown in FIG. 11, but this embodiment does not limit the specific realizing mode.

According to an implementation of this embodiment, the first feedback unit 73 may include:

a timing module 731, adapted to time after the bus transaction blocking unit 72 blocks the current bus transfer, and send a response sending indication when a preset delay time is exceeded; and a response feedback module 732, adapted to receive the response sending indication, and feed back a DFS response signal to the bus side.

In this implementation, the timing module 731 performs a time-out count. As described above, as for some bus operations, for example, a bufferable write operation, even when the current bus transfer is blocked, the peripheral component actually still works internally to process the previous bus operation. Therefore, after the current bus transfer is blocked, a period of time must be delayed, that is, when timing out, the timing module 73 of this implementation sends a response sending indication to the response feedback module 732, so as to ensure that the peripheral component does not work internally. Then, the response feedback module 732 feeds back a DFS response signal to the DFS main controller, to indicate that the current bus operation is blocked and the peripheral component does not work any more.

In this implementation, the delay time may be counted by the bus clock, and the count value may be configured by software, but this embodiment is not limited in this aspect.

According to another implementation of this embodiment, the variable-frequency bus adapter further includes:

a bypass unit 77, adapted to transparently transmit all bus transfers when being configured to be enabled, or being configured to be disabled but failing to receive a DFS request signal.

In this implementation, the variable-frequency bus adapter is additionally provided with the function of supporting bypass, that is, when being configured to be enabled, even during the DFS of the bus clock, the variable-frequency bus adapter does not perform any blocking processing, and performs transparent transmission on all bus operations; and when being configured to be disabled, if the DFS is not performed, the variable-frequency bus adapter also performs transparent transmission on all bus operations by the bypass unit 77 of this implementation.

According to another implementation of this embodiment, the variable-frequency bus adapter further includes:

a bus slave interface and configuration register 78, adapted to configure a value of the preset delay time of the timing module 731, or configure the bypass unit 77 to be enabled or disabled.

In this implementation, the bus accesses the configuration register inside the variable-frequency bus adapter of this embodiment through a slave interface, and configures the Bypass to be enabled, or configures the delay count value.

FIG. 8 is a schematic structural view of interfaces and an internal structure of the variable-frequency bus adapter of this embodiment. Referring to FIG. 8, the variable-frequency bus adapter includes: a DFS handshake unit 81, adapted to realize the functions of the DFS blocking indication generating unit 71, the first feedback unit 73, the DFS unblocking indication generating unit 74, and the second feedback unit 76, which are as described above, so that the details will not be described herein again; a bus transaction processing unit 82, adapted to realize the functions of the bus transaction blocking unit 72 and the bus transaction unblocking unit 75, which are as described above, so that the details will not be described herein again; a timing unit 83, adapted to realize the function of the timing module 731, which is as described above, so that the details will not be described herein again; a bypass unit 84, adapted to realize the function of the bypass unit 77, which is as described above, so that the details will not be described herein again; and a bus slave interface and configuration register 85, adapted to realize the function of the bus slave interface and configuration register 78, which is as described above, so that the details will not be described herein again.

In this embodiment, the variable-frequency bus adapter may be applied to various system-on-chip (SoC) buses, including AHB, AXI, OPB, PLB, OCP, and Wishbone, and is disposed between a variable-frequency bus and a peripheral component, and in different bus systems, the variable-frequency bus adapter of this embodiment needs to adjust the bus interface signal and the bus transaction processing unit.

In this embodiment, the peripheral component and the bus may belong to the same clock domain or different clock domains, and the peripheral component may be a bus master device or a bus slave device, but this embodiment is not limited in this aspect.

Still referring to FIG. 8, the bus interface signal of the bus side is a signal of a bus interface connected to the bus system, and the bus interface may be a master interface or a slave interface.

The bus interface signal of the peripheral component side is a signal of a bus interface connected to the peripheral component, and the bus interface may be a master interface or a slave interface.

The bus slave interface signal is a signal of an access interface of the configuration register, and is mainly used for software query and to configure the Bypass to be enabled and the delay count value.

The Bypass enabling configuration of the bypass unit 84 may be performed by adopting a single-bit configuration, where 1'*b*1 represents that the Bypass is enabled, 1'*b*0 represents that the Bypass is disabled, and by default, the Bypass is enabled.

The configuration of the delay count value on the timing unit 83 may be performed by adopting a 32-bit configuration, which supports a delay of 0 to $2^{32}-1$ bus clock cycles, and by default, 0 bus clock cycle is delayed, that is, no delay exists.

The DFS handshake signal is a handshake signal with the DFS main controller of the bus. In this embodiment, the handshake signal may be two or more signals, and the handshake method may be level active or edge active, but this embodiment is not limited in this aspect.

Figure 9A:
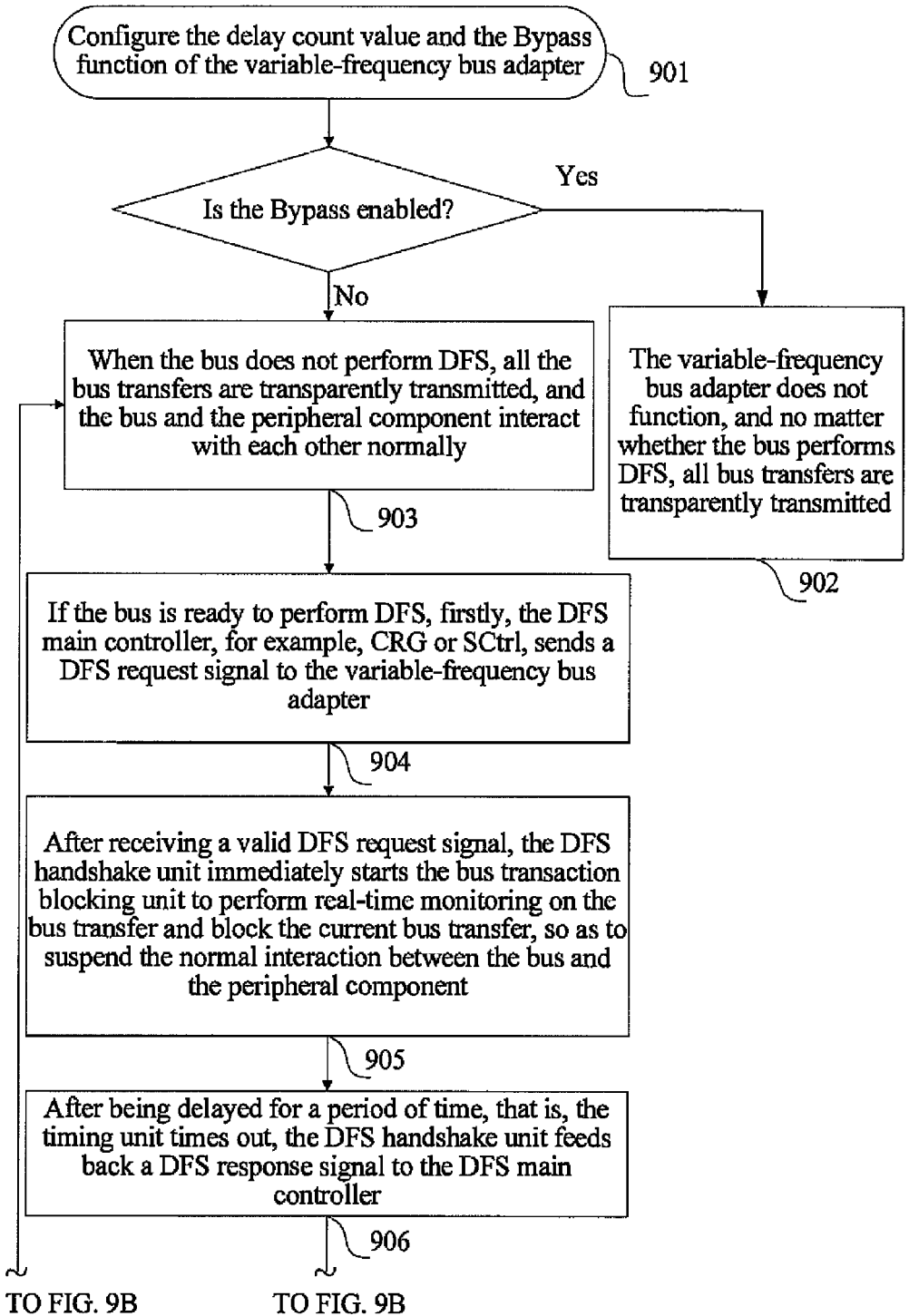
FIGS. 9A and 9B are a flow chart of operation of a variable-frequency bus adapter according to an embodiment of the present invention.
Figure 9B:
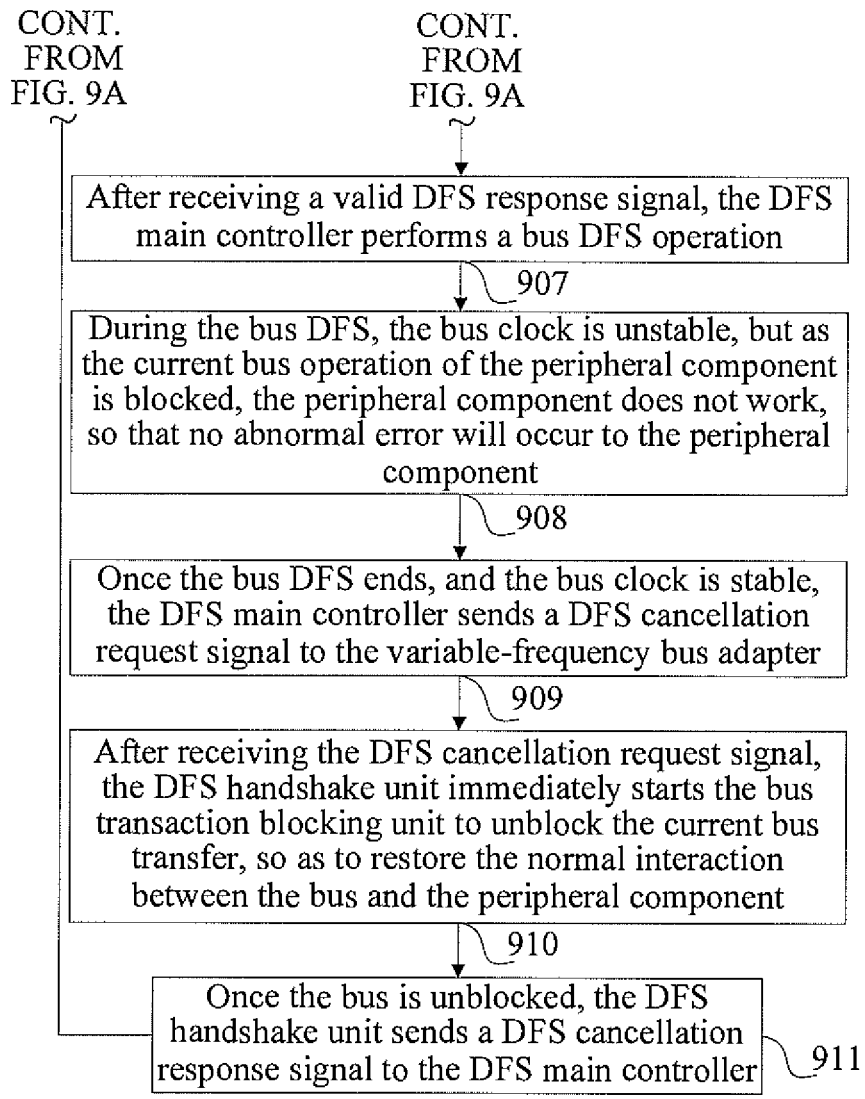

FIG. 9 is a flow chart of operation of the variable-frequency bus adapter of this embodiment during the bus DFS. Referring to FIG. 9, the process includes the following steps.

In step 901, the delay count value and the Bypass function of the variable-frequency bus adapter are configured.

In step 902, if the Bypass is enabled, the variable-frequency bus adapter of this embodiment does not function, and no matter whether the bus performs DFS, all bus transfers are transparently transmitted.

In step 903, if the Bypass is disabled, when the bus does not perform DFS, all the bus transfers are transparently transmitted, and the bus and the peripheral component interact with each other normally.

In step 904, if the bus is ready to perform DFS, firstly, the DFS main controller, for example, CRG or SCtrl, sends a DFS request signal to the variable-frequency bus adapter of this embodiment.

In step 905, after receiving a valid DFS request signal, the DFS handshake unit of the variable-frequency bus adapter of this embodiment immediately starts the bus transaction blocking unit to perform real-time monitoring on the bus transfer and block the current bus transfer, so as to suspend the normal interaction between the bus and the peripheral component.

In step 906, after being delayed for a period of time, that is, the timing unit times out, the DFS handshake unit feeds back a DFS response signal to the DFS main controller.

In step 907, after receiving a valid DFS response signal, the DFS main controller performs a bus DFS operation.

In step 908, during the bus DFS, the bus clock is unstable, but as the current bus operation of the peripheral component is blocked, the peripheral component does not work, so that no abnormal error will occur to the peripheral component.

In step 909, once the bus DFS ends, and the bus clock is stable, the DFS main controller sends a DFS cancellation request signal to the variable-frequency bus adapter of this embodiment.

In step 910, after receiving the DFS cancellation request signal, the DFS handshake unit immediately starts the bus transaction blocking unit to unblock the current bus transfer, so as to restore the normal interaction between the bus and the peripheral component.

In step 911, once the bus is unblocked, the DFS handshake unit sends a DFS cancellation response signal to the DFS main controller.

Thus, a bus DFS process ends, and the process proceeds to step 903.

With the variable-frequency bus adapter of this embodiment, when the bus clock is stable, the bus and the peripheral component interact with each other normally, and all the bus transfers are transparently transmitted, and will not be influenced by the variable-frequency bus adapter. During the DFS of the bus clock, the bus transfer between the bus and the peripheral component is under real-time monitoring of the variable-frequency bus adapter, and the bus transfer is temporarily blocked, so as to prevent abnormal operation of the peripheral component that may occur when the bus clock is unstable. Till the DFS of the bus clock ends, the variable-frequency bus adapter restores the normal interaction between the bus and the peripheral component.

The variable-frequency bus adapter of this embodiment does not need to increase the number of clock domains of the system or modify the peripheral component, thus reducing the complexity of the implementation of the system, and improving the applicability of DVFS.

FIG. 10 is a schematic structural view of a variable-frequency bus adapter according to an implementation of this embodiment. The variable-frequency bus adapter of this implementation is applied to an AMBA3 AXI variable-frequency bus, and because the AXI bus read/write channels are separated, the variable-frequency bus adapter monitors and blocks the read/write channels independently. Referring to FIG. 10, in this implementation, the variable-frequency bus adapter includes: a DFS handshake unit 101, an AXI read channel blocking unit 102, an AXI write channel blocking unit 103, a timing unit 104, a bypass unit 105, and a bus slave interface and configuration register 106.

The functions of the DFS handshake unit 101, the timing unit 104, the bypass unit 105, and the bus slave interface and configuration register 106 are the same as those of the parts of the variable-frequency bus adapter of the embodiment in FIG. 8, so that the details will not be described herein again.

The AXI read channel blocking unit 102 is adapted to block and unblock the AXI read channel.

In this implementation, the AXI read channel includes a read address bus and a read data bus, and uses a bus clock ACLK. The AXI read channel blocking unit 102 needs to detect a bus control signal between the bus and the peripheral component. Herein, the bus control signal includes:

Arvalid: representing a read address and control information valid flag;

Arready: representing that a slave device is capable of receiving read address and control information;

Rvalid: representing that read data is valid;

Rready: representing that a master device is capable of receiving read data; and Rlast: representing the last read data.

In this implementation, when the AXI read channel blocking unit 102 needs to perform the blocking operation, the following actions are performed.

As for the read address bus, an arready signal of the bus side is set to be a preset low level, which is referred to as "set low" in the following, and an arvalid signal of the peripheral component side is set low.

As for the read data bus, after it is detected that an rlast signal is valid, that is, after the current transfer completes the last read data, an rready signal of the peripheral component side is set low, and an rvalid signal of the bus side is set low. However, it should be noted that, because the AXI Protocol supports outstanding characteristics, the peripheral component may buffer multiple read data. In order to ensure that all read operations inside the peripheral component can be completed, the AXI read channel blocking unit 102 must detect the number of outstanding reads on the current read bus, and after the transmission of the last read data of the last read operation is completed, an rready signal of the peripheral component side is set low, and an rvalid signal of the bus side is set low.

In this implementation, when the AXI read channel blocking unit 102 performs the unblocking operation, the following actions are performed.

As for the read address bus, an arready signal of the peripheral component side is transparently transmitted to the bus side, and an arvalid signal of the bus side is transparently transmitted to the peripheral component side.

As for the read data bus, an rready signal of the bus side is transparently transmitted to the peripheral component side, and an rvalid signal of the peripheral component side is transparently transmitted to the bus side.

The AXI write channel blocking unit 103 is adapted to block and unblock the AXI write channel.

In this implementation, the AXI write channel includes a write address bus, a write data bus, and a write response bus, and uses a bus clock ACLK. The AXI write channel blocking unit 103 needs to detect a bus control signal between the bus and the peripheral component. Herein, the bus control signal includes:

Awvalid: representing a write address and control information valid flag;

Awready: representing that a slave device is capable of receiving write address and control information;

Wvalid: representing that write data is valid;

Wready: representing that a slave device is capable of receiving write data;

Wlast: representing the last write data;

Bvalid: representing completion of a write operation fed back by a slave device; and Bready: representing that a master device is capable of receiving feedback information.

In this implementation, when the AXI write channel blocking unit 103 needs to perform the blocking operation, the following actions are performed.

As for the write address bus, an awready signal of the bus side is set low, and an awvalid signal of the peripheral component side is set low.

As for the write data bus, after it is detected that a wlast signal is valid, that is, after the current transfer completes the last write data, a wready signal of the bus side is set low, and a wvalid signal of the peripheral component side is set low.

As for the write response bus, a bready signal of the peripheral component side is set low, and a bvalid signal of the bus side is set low.

In this implementation, when the AXI write channel blocking unit 103 performs the unblocking operation, the following actions are performed.

As for the write address bus, an awready signal of the peripheral component side is transparently transmitted to the bus side, and an awvalid signal of the bus side is transparently transmitted to the peripheral component side.

As for the write data bus, a wready signal of the peripheral component side is transparently transmitted to the bus side, and a wvalid signal of the bus side is transparently transmitted to the peripheral component side.

As for the write response bus, a bready signal of the bus side is transparently transmitted to the peripheral component side, and a bvalid signal of the peripheral component side is transparently transmitted to the bus side.

FIG. 11 is a schematic structural view of a variable-frequency bus adapter according to another implementation of this embodiment. The variable-frequency bus adapter of this implementation is applied to an AMBA2 AHB variable-frequency bus, and because the AHB bus read/write channels are multiplexed, the variable-frequency bus adapter only needs to monitor and block a set of AHB buses. Referring to FIG. 11, in this embodiment, the variable-frequency bus adapter includes: a DFS handshake unit 1101, an AHB bus blocking unit 1102, a timing unit 1103, a bypass unit 1104, and a bus slave interface and configuration register 1105.

The functions of the DFS handshake unit 1101, the timing unit 1103, the bypass unit 1104, and the bus slave interface and configuration register 1105 are the same as those of the parts of the variable-frequency bus adapter of the embodiment in FIG. 8, so that the details will not be described herein again.

The AHB bus blocking unit 1102 is adapted to block and unblock the AHB bus transfer.

In this implementation, the AHB bus uses a bus clock HCLK. The AHB bus blocking unit 1102 needs to detect a bus control signal between the bus and the peripheral component. Herein, the bus control signal includes:

Htrans: representing the type of the current transfer; and

Hready: representing that a slave device is capable of receiving a current access.

In this implementation, when the AHB bus blocking unit 1102 needs to perform the blocking operation, the following actions are performed.

When the current bus transfer is an idle or non-sequential type, a hready signal of the bus side is set low, and an htrans signal of the peripheral component side is set to be an idle type.

In this implementation, when the AHB bus blocking unit 1102 needs to perform the unblocking operation, the following actions are performed.

A hready signal of the peripheral component side is transparently transmitted to the bus side, and an htrans signal of the bus side is transparently transmitted to the peripheral component side.

According to the variable-frequency bus adapter of this embodiment, with the method of temporarily blocking the bus transfer during the bus DFS, the undesired influence on the peripheral component caused by the unstable bus clock during the bus DFS is avoided. In addition, the variable-frequency bus adapter of this embodiment supports any bus and any peripheral component and thus is widely applicable, does not influence the efficiency of the bus, and is simple to implement and easy to verify.

The variable-frequency bus adapter of this embodiment does not need to increase the number of clock domains of the system or modify the peripheral component, thus reducing the complexity of the implementation of the system, and improving the applicability of DVFS.

Figure 12:
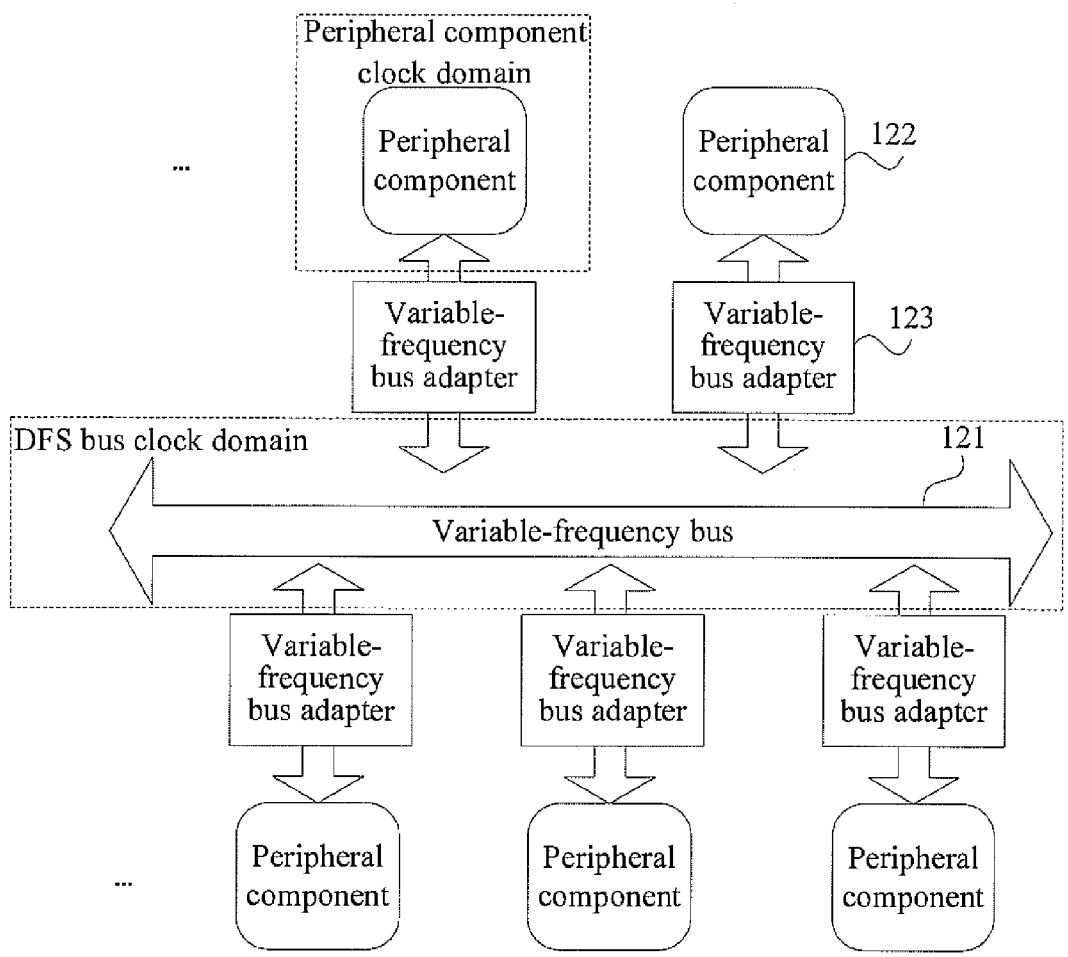
FIG. 12 is a schematic view of components of a variable-frequency bus adapting system according to an embodiment of the present invention.

FIG. 12 is a schematic view of components of a variable-frequency bus adapting system according to an embodiment of the present invention. Referring to FIG. 12, the variable-frequency bus adapting system includes a variable-frequency bus 121 and a plurality of peripheral components 122, and further includes a plurality of variable-frequency bus adapters 123, where the variable-frequency bus adapters 123 are disposed between the variable-frequency bus 121 and the peripheral components 122 respectively, as shown in FIG. 12.

In this embodiment, the variable-frequency bus adapter 123 may be realized by the implementations as shown in FIGS. 7, 8, 10, and 11, and the variable-frequency bus adapter has been described in detail in the implementations in FIGS. 7, 8, 10, and 11, so that the details will not be described herein again.

In this embodiment, the peripheral components 122 and the variable-frequency bus 121 may belong to the same clock domain or different clock domains, but this embodiment is not limited in this aspect.

In this embodiment, the peripheral components 122 may be bus master devices or bus slave devices.

In this embodiment, the variable-frequency bus may be various SoC variable-frequency bus, for example, AHB, AXI, OPB, PLB, OCP, and Wishbone.

The variable-frequency bus adapting system of this embodiment does not need to increase the number of clock domains of the system or modify the peripheral component, thus reducing the complexity of the implementation of the system, and improving the applicability of DVFS.

The steps of the methods and algorithms according to the embodiments of the present invention may be implemented by hardware, software modules executed by a processor, or a combination thereof. The software modules may be stored in a random access memory (RAM), a memory, a read-only memory (ROM), an electrically programmable ROM, an electrically erasable and programmable ROM, a register, a hard disk, a removable disk, a CD-ROM, or any other storage media known in the industry.

The objectives, technical solutions, and beneficial effects of the present invention have been described in further detail through the above specific embodiments. It should be understood that the above descriptions are merely specific embodiments of the present invention, but not intended to limit the present invention. Any modification, equivalent replacement, or improvement made without departing from the spirit and principle of the present invention should fall within the scope of the present invention.

What is claimed is:

1. A variable-frequency bus adapting method, comprising:
generating a bus blocking indication according to a dynamic frequency scaling (DFS) request signal sent by a bus side;
blocking a current bus transfer according to the bus blocking indication, wherein blocking the current bus transfer comprises:
   detecting a bus control signal between the bus side and a peripheral component side,
   as for a read address bus, setting a detected bus control signal of the bus side representing that a slave device is configured for receiving read address and control information to be a preset low level, and setting a detected bus control signal of the peripheral component side representing a read address and control information valid flag to be a preset low level,
   as for a read data bus, after the current bus transfer completes the last read data, setting a detected bus control signal of the peripheral component side representing that a master device is configured for receiving read data to be a preset low level, and setting a detected bus control signal of the bus side representing that read data is valid to be a preset low level,
   as for a write address bus, setting a detected bus control signal of the bus side representing that a slave device is configured for receiving write address and control information to be a preset low level, and setting a detected bus control signal of the peripheral component side representing a write address and control information valid flag to be a preset low level,
   as for a write data bus, after the current bus transfer completes the last write data, setting a detected bus control signal of the bus side representing that a slave device is configured for receiving write data to be a preset low level, and setting a detected bus control signal of the peripheral component side representing that write data is valid to be a preset low level, and
   as for a write response bus, setting a detected bus control signal of the peripheral component side representing that a master device is configured for receiving feedback information to be a preset low level, and setting a detected bus control signal of the bus side representing completion of a write operation fed back by a slave device to be a preset low level; and
feeding back a DFS response signal to the bus side after blocking the current bus transfer, wherein the DFS response signal is adapted to enable the bus side to perform a DFS operation.

2. The method according to claim 1, further comprising:
generating an unblocking indication according to a DFS cancellation request signal sent by the bus side, wherein the DFS cancellation request signal is sent by the bus side when the DFS operation ends;
unblocking the current bus transfer according to the unblocking indication; and
feeding back a DFS cancellation response signal to the bus side.

3. The method according to claim 2, wherein unblocking the current bus transfer comprises:
detecting a bus control signal between the bus side and a peripheral component side;
as for the read address bus, transparently transmitting the detected bus control signal of the peripheral component side representing that the slave device is configured for receiving read address and control information to the bus side, and transparently transmitting the detected bus control signal of the bus side representing the read address and control information valid flag to the peripheral component side;
as for the read data bus, transparently transmitting the detected bus control signal of the bus side representing that the master device is configured for receiving the read data to the peripheral component side, and transparently transmitting the detected bus control signal of the peripheral component side representing that the read data is valid to the bus side;
as for the write address bus, transparently transmitting the detected bus control signal of the peripheral component side representing that the slave device is configured for receiving the write address and control information to the bus side, and transparently transmitting the detected bus control signal of the bus side representing the write address and control information valid flag to the peripheral component side;

as for the write data bus, transparently transmitting the detected bus control signal of the peripheral component side representing that the slave device is configured for receiving the write data to the bus side, and transparently transmitting the detected bus control signal of the bus side representing that the write data is valid to the peripheral component side; and as for the write response bus, transparently transmitting the detected bus control signal of the bus side representing that the master device is configured for receiving the feedback information to the peripheral component side, and transparently transmitting the detected bus control signal of the peripheral component side representing completion of the write operation fed back by the slave device to the bus side.

4. The method according to claim 2, wherein unblocking the current bus transfer comprises:

detecting a bus control signal between the bus side and a peripheral component side;

transparently transmitting a detected bus control signal of the peripheral component side representing that a slave device is configured for receiving a current access to the bus side, and transparently transmitting a detected bus control signal of the bus side representing the type of the current bus transfer to the peripheral component side.

5. The method according to claim 1, wherein the blocking the current bus transfer comprises:

if the current bus transfer is an idle or non-sequential type, setting a detected bus control signal of the bus side representing that a slave device is configured for receiving a current access to be a preset low level, and setting a detected bus control signal of the peripheral component side representing the type of the current bus transfer to be an idle type.

6. The method according to claim 1, wherein the feeding back the DFS response signal to the bus side comprises:

feeding back the DFS response signal to the bus side when a preset delay time is exceeded.

7. A variable-frequency bus adapter, comprising:

a dynamic frequency scaling (DFS) Mocking indication generating unit, adapted to generate a bus blocking indication according to a DFS request signal sent by a bus side;

a bus transaction blocking unit, adapted to block a current bus transfer according to the bus blocking indication, wherein the bus transaction Mocking unit comprises:

a first detecting module, adapted to detect a bus control signal between a bus and a peripheral component, and a first blocking module, adapted to, as for a read address bus, set a bus control signal of the bus side detected by the first detecting module and representing that a slave device is configured for receiving read address and control information to be a preset low level, and set a bus control signal of the peripheral component side detected by the first detecting module and representing a read address and control information valid flag to be a preset low level; as for a read data bus, after the current bus transfer completes the last read data, set a bus control signal of the peripheral component side detected by the first detecting module and representing that a master device is configured for receiving read data to be a preset low level, and set a bus control signal of the bus side detected by the first detecting module and representing that read data is valid to be a preset low level; as for a write address bus, set a bus control signal of the bus side detected by the first detecting module and representing that a slave device is configured for receiving write address and control information to be a preset low level, and set a bus control signal of the peripheral component side detected by the first detecting module and representing a write address and control information valid flag to a preset low level; as for a write data bus, after the current bus transfer completes the last write data, set a bus control signal of the bus side detected by the first detecting module and representing that a slave device is configured for receiving write data to be a preset low level, and set a bus control signal of the peripheral component side detected by the first detecting module and representing that write data is valid to be a preset low level; and as for a write response bus, set a bus control signal of the peripheral component side detected by the first detecting module and representing that a master device is configured for receiving feedback information to be a preset low level, and set a bus control signal of the bus side detected by the first detecting module and representing completion of a write operation fed back by a slave device to be a preset low level; and a first feedback unit, adapted to feed back a DFS response signal to the bus side after the bus transaction blocking unit blocks the current bus transfer, wherein the DFS response signal is adapted to enable the bus side to perform a DFS operation.

8. The variable-frequency bus adapter according to claim 7, further comprising:

a DFS unblocking indication generating unit, adapted to generate an unblocking indication according to a DFS cancellation request signal sent by the bus side, wherein the DFS cancellation request signal is sent by the bus side when the DFS operation ends;

a bus transaction unblocking unit, adapted to unblock the current bus transfer according to the unblocking indication; and a second feedback unit, adapted to feed back a DFS cancellation response signal to the bus side after the bus transaction blocking unit unblocks the current bus transfer.

9. The variable-frequency bus adapter according to claim 8, wherein the bus transaction unblocking unit comprises:

a second detecting module, adapted to detect a bus control signal between a bus and a peripheral component; and a first unblocking module, adapted to, as for the read address bus, transparently transmit the bus control signal of the peripheral component side detected by the second detecting module and representing that the slave device is capable of receiving read address and control information to the bus side, and transparently transmit the bus control signal of the bus side detected by the second detecting module and representing the read address and control information valid flag to the peripheral component side; as for the read data bus, transparently transmit the bus control signal of the bus side detected by the second detecting module and representing that the master device is capable of receiving read data to the peripheral component side, and transparently transmit the bus control signal of the peripheral component side detected by the second detecting module and representing that read data is valid to the bus side; as for the write address bus, transparently transmit the bus control signal of the peripheral component side detected by the second detecting module and representing that the slave device is capable of receiving the write address and control information to the bus side, and transparently transmit the bus control signal of the bus side detected by the second detecting module and representing the write address and control information valid flag to the peripheral component side; as for the write data bus, transparently transmit the bus control signal of the peripheral component side detected by the second detecting module and representing that the slave device is capable of receiving the write data to the bus side, and transparently transmit the bus control signal of the bus side detected by the second detecting module and representing that the write data is valid to the peripheral component side; and as for the write response bus, transparently transmit the bus control signal of the bus side detected by the second detecting module and representing that the master device is capable of receiving the feedback information to the peripheral component side, and transparently transmit the bus control signal of the peripheral component side detected by the second detecting module and representing completion of the write operation fed back by the slave device to the bus side.

10. The variable-frequency bus adapter according to claim 8, wherein the bus transaction unblocking unit comprises:
a fourth detecting module, adapted to detect a bus control signal between a bus and a peripheral component; and
a second unblocking module, adapted to transparently transmit a bus control signal of the peripheral component side detected by the fourth detecting module and representing that a slave device is capable of receiving a current access to the bus side, and transparently transmit a bus control signal of the bus side detected by the fourth detecting module and representing the type of the current bus transfer to the peripheral component side.

11. The variable-frequency bus adapter according to claim 7, wherein the first feedback unit comprises:
a timing module, adapted to time after the bus transaction blocking unit blocks the current bus transfer, and send a response sending indication when a preset delay time is exceeded; and
a response feedback module, adapted to receive the response sending indication, and feed back a DFS response signal to the bus side.

12. The variable-frequency bus adapter according to claim 11, further comprising:
a bus slave interface and configuration register, adapted to configure a value of the preset delay time of the timing module, or configure the bypass unit to be enabled or disabled.

13. The variable-frequency bus adapter according to claim 7, further comprising:
a bypass unit, adapted to transparently transmit all bus transfers when being configured to be enabled, or being configured to be disabled but failing to receive a DFS request signal.

14. The variable-frequency bus adapter according to claim 7, wherein the bus transaction blocking unit comprises:
a third detecting module, adapted to detect a bus control signal between a bus and a peripheral component; and
a second blocking module, adapted to, when the current bus transfer is an idle or non-sequential type, set a bus control signal of the bus side detected by the third detecting module and representing that a slave device is capable of receiving a current access to be a preset low level, and set a bus control signal of the peripheral component side detected by the third detecting module and representing the type of the current bus transfer to be an idle type.

15. A variable-frequency bus adapting method, comprising:
generating a bus blocking indication according to a dynamic frequency scaling (DFS) request signal sent by a bus side;
blocking a current bus transfer according to the bus blocking indication;
generating an unblocking indication according to a DFS cancellation request signal sent by the bus side, wherein the DFS cancellation request signal is sent by the bus side when the DFS operation ends;
unblocking the current bus transfer according to the unblocking indication, wherein unblocking the current bus transfer comprises:
detecting a bus control signal between the bus side and a peripheral component side,
as for a read address bus, transparently transmitting a detected bus control signal of the peripheral component side representing that a slave device is configured for receiving read address and control information to the bus side, and transparently transmitting a detected bus control signal of the bus side representing a read address and control information valid flag to the peripheral component side;
as for a read data bus, transparently transmitting a detected bus control signal of the bus side representing that a master device is configured for receiving read data to the peripheral component side, and transparently transmitting a detected bus control signal of the peripheral component side representing that read data is valid to the bus side,
as for a write address bus, transparently transmitting a detected bus control signal of the peripheral component side representing that a slave device is configured for receiving write address and control information to the bus side, and transparently transmitting a detected bus control signal of the bus side representing a write address and control information valid flag to the peripheral component side,
as for a write data bus, transparently transmitting a detected bus control signal of the peripheral component side representing that a slave device is configured for receiving write data to the bus side, and transparently transmitting a detected bus control signal of the bus side representing that write data is valid to the peripheral component side, and
as for a the write response bus, transparently transmitting a detected bus control signal of the bus side representing that a master device is configured for receiving feedback information to the peripheral component side, and transparently transmitting a detected bus control signal of the peripheral component side representing completion of a write operation fed back by a slave device to the bus side;
feeding back a DFS response signal to the bus side after blocking the current bus transfer, wherein the DFS response signal is adapted to enable the bus side to perform a DFS operation; and
feeding back a DFS cancellation response signal to the bus side.

16. The method according to claim 15, wherein unblocking the current bus transfer comprises:
transparently transmitting a detected bus control signal of the peripheral component side representing that a slave device is configured for receiving a current access to the bus side, and transparently transmitting a detected bus control signal of the bus side representing the type of the current bus transfer to the peripheral component side.

17. A variable-frequency bus adapter, comprising:
- a dynamic frequency scaling (DFS) blocking indication generating unit, adapted to generate a bus blocking indication according to a DFS request signal sent by a bus side;
- a bus transaction blocking unit, adapted to block a current bus transfer according to the bus blocking indication;
- a DFS unblocking indication generating unit, adapted to generate an unblocking indication according to a DFS cancellation request signal sent by the bus side, wherein the DFS cancellation request signal is sent by the bus side when the DFS operation ends;
- a bus transaction unblocking unit, adapted to unblock the current bus transfer according to the unblocking indication, wherein the bus transaction unblocking unit comprises:
  - a detecting module, adapted to detect a bus control signal between a bus and a peripheral component, and
  - a first unblocking module, adapted to, as for a read address bus, transparently transmit a bus control signal of the peripheral component side detected by the second detecting module and representing that a slave device is configured for receiving read address and control information to the bus side, and transparently transmit a bus control signal of the bus side detected by the second detecting module and representing a read address and control information valid flag to the peripheral component side; as for a read data bus, transparently transmit a bus control signal of the bus side detected by the second detecting module and representing that a master device is configured for receiving read data to the peripheral component side, and transparently transmit a bus control signal of the peripheral component side detected by the second detecting module and representing that read data is valid to the bus side; as for a write address bus, transparently transmit a bus control signal of the peripheral component side detected by the second detecting module and representing that a slave device is configured for receiving write address and control information to the bus side, and transparently transmit a bus control signal of the bus side detected by the second detecting module and representing a write address and control information valid flag to the peripheral component side; as for a write data bus, transparently transmit a bus control signal of the peripheral component side detected by the second detecting module and representing that a slave device is configured for receiving write data to the bus side, and transparently transmit a bus control signal of the bus side detected by the second detecting module and representing that write data is valid to the peripheral component side; and as for a write response bus, transparently transmit a bus control signal of the bus side detected by the second detecting module and representing that a master device is configured for receiving feedback information to the peripheral component side, and transparently transmit a bus control signal of the peripheral component side detected by the second detecting module and representing completion of a write operation fed back by a slave device to the bus side;
- a first feedback unit, adapted to feed back a DFS response signal to the bus side after the bus transaction blocking unit blocks the current bus transfer, wherein the DFS response signal is adapted to enable the bus side to perform a DFS operation; and
- a second feedback unit, adapted to feed back a DFS cancellation response signal to the bus side after the bus transaction blocking unit unblocks the current bus transfer.

18. The variable-frequency bus adapter according to claim 17, wherein the bus transaction unblocking unit comprises:
- a second unblocking module, adapted to transparently transmit a bus control signal of the peripheral component side detected by the detecting module and representing that a slave device is capable of receiving a current access to the bus side, and transparently transmit a bus control signal of the bus side detected by the detecting module and representing the type of the current bus transfer to the peripheral component side.

* * * * *

UNITED STATES PATENT AND TRADEMARK OFFICE
CERTIFICATE OF CORRECTION

PATENT NO. : 8,468,286 B2  
APPLICATION NO. : 13/007332  
DATED : June 18, 2013  
INVENTOR(S) : Cong Yao et al.

Page 1 of 1

It is certified that error appears in the above-identified patent and that said Letters Patent is hereby corrected as shown below:

In the Claims

Column 17, Claim 7, line 43, delete "Mocking" and insert -- blocking --; and

Column 17, Claim 7, line 49, delete "Mocking" and insert -- blocking --.

Signed and Sealed this
Fourteenth Day of October, 2014

Michelle K. Lee
*Deputy Director of the United States Patent and Trademark Office*